(12) United States Patent
Cook

(10) Patent No.: US 7,260,616 B1
(45) Date of Patent: Aug. 21, 2007

(54) COMMUNICATION HUB WITH AUTOMATIC DEVICE REGISTRATION

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 918 days.

(21) Appl. No.: 09/928,610

(22) Filed: Aug. 13, 2001

(51) Int. Cl.
*G06F 15/13* (2006.01)
(52) U.S. Cl. ............ 709/218; 709/220; 370/316; 713/201
(58) Field of Classification Search ........ 709/218, 709/220; 370/316; 713/201
See application file for complete search history.

(56) References Cited

U.S. PATENT DOCUMENTS

| | | | | |
|---|---|---|---|---|
| 4,430,731 A | * | 2/1984 | Gimple et al. | 725/131 |
| 6,026,078 A | * | 2/2000 | Smith | 370/258 |
| 6,286,038 B1 | * | 9/2001 | Reichmeyer et al. | 709/220 |
| 6,731,738 B1 | * | 5/2004 | Qiu et al. | 379/219 |
| 2001/0043573 A1 | * | 11/2001 | Kelly | 370/316 |
| 2002/0138728 A1 | * | 9/2002 | Parfenov et al. | 713/170 |
| 2002/0178236 A1 | * | 11/2002 | Patel et al. | 709/218 |
| 2003/0041268 A1 | * | 2/2003 | Hashimoto | 713/201 |

* cited by examiner

*Primary Examiner*—Jinsong Hu

(57) ABSTRACT

A communication hub that includes a control system, a mode selection interface, and an interface system. The control system is configured to switch between a configuration mode and an operation mode. In response to switching to the configuration mode, the control system receives a registration request from unauthorized communication device. The control system processes the registration request to automatically authorize the communication device for use with the communication hub. In response to switching to the operation mode, the control system controls the exchange of communications between a plurality of previously authorized communication devices, the newly authorized communication device, and a network system. The mode selection interface is configured to receive a user input that selects one of the configuration mode or the operation mode and cause the control system to enter the selected one of the configuration mode or the operation mode. The interface system is configured to exchange communications with the network system, receive the registration request from the communication device and provide the registration request to the control system.

25 Claims, 5 Drawing Sheets

COMMUNICATION HUB WITH AUTOMATIC DEVICE REGISTRATION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to communication devices, and specifically, to a communication hub configured to automatically authorize communication devices for use with the communication hub that is connected to a network system.

2. Description of the Prior Art

A communication hub is a location in a communication network where a plurality of circuits are brought together and multiplexed into a single, generally higher speed connection. One example of a communication hub is a private branch exchange (PBX). PBX's are private wireline or wireless switching systems, usually located at a customer premise. Wireless PBX's are commonly referred to in the art as WPBX's and provide wireless communication services.

Communication hubs offer several advantages such as eliminating the need to wire each device at the customer's premise to other devices at the premise. Additionally, communication hubs eliminate the need to wire each device directly to a central office. The individual communication devices connect to the communication hub, which in turn connects by a trunk or trunk group to one or more communication networks.

Unfortunately, it is a problem in the art to add additional devices to communication hubs. When a new device is connected, the hub must be configured to know about the device and recognize the device as an authorized device. Typically, this requires the customer to learn a complicated configuration interface or contact the service provider for configuration. Additionally, the configuration for even the simplest device can require reprogramming of the hub and/or the addition of new hardware such as an interface card. Therefore, the creation of user friendly communication hubs is a major challenge as well as an important factor for customer acceptance.

One prior system registers wireless garage door openers for use with a specific garage door controller. The garage door controller is attached to the garage and opens the garage door by using a mechanical screw, chain, or cable system. To register the wireless garage door opener, a user presses a button on the garage door controller to enter into configuration mode. The user then presses a button on the wireless garage door opener to register the wireless garage door opener with the garage door controller. Unfortunately, these wireless garage door openers are not communication devices and are not used to register communication devices with a communication hub.

SUMMARY OF THE INVENTION

The present invention advances the art by providing a communication hub that automatically configures itself to authorize new communication devices for use with the communication hub. The present communication hub comprises a mode selection interface, a control system and an interface system. The mode selection interface is configured to receive a user input that selects one of a configuration mode and an operation mode. The mode selection interface processes the input to cause the control system to enter the selected one of the configuration mode and the operation mode. Responsive to switching to the configuration mode, the control system is configured to receive a registration request from an unauthorized communication device and process the registration request to automatically authorize the communication device for use with the communication hub. Responsive to switching to the operation mode the control system is configured to control an exchange of communications between the newly authorized communication device, a plurality of previously authorized communication devices, and a network system. The interface system is configured to receive the registration request for the control system and exchange the communications between the plurality of previously authorized communication devices, the newly authorized communication device, and the network system.

In some examples of the present invention, the control system also generates a registration complete message for the newly authorized communication device that causes the communication device to indicate to the user that the device is now authorized for use with the communication hub. In other examples of the present invention, the control system is configured to cause the communication hub to indicate to the user that the communication device is authorized for use with the communication hub.

A first advantage of the present communication hub is that new communication devices are added to a communication system without a complicated configuration interface or contacting the service provider for configuration. A second advantage of the present communication hub is that preprogramming the communication hub to recognize new devices is not required. In the configuration mode, the communication hub treats a conventional registration request generated by the device as a configuration request. The communication hub processes the registration request to authorize the new device for use with the communication hub. A third advantage of the present communication hub is that in some examples of the invention, the hub receives an identifier from the newly authorized communication device and maps the identifier to the device or a virtual connection for use by the device. A fourth advantage of the present communication hub is that new devices are not reprogrammed for use with the hub, but rather, the hub treats the registration operation of the device as a configuration request and automatically configures itself and authorizes the device for use with the hub.

DETAILED DESCRIPTION OF THE PREFERRED EMBODIMENT

Figure 1:
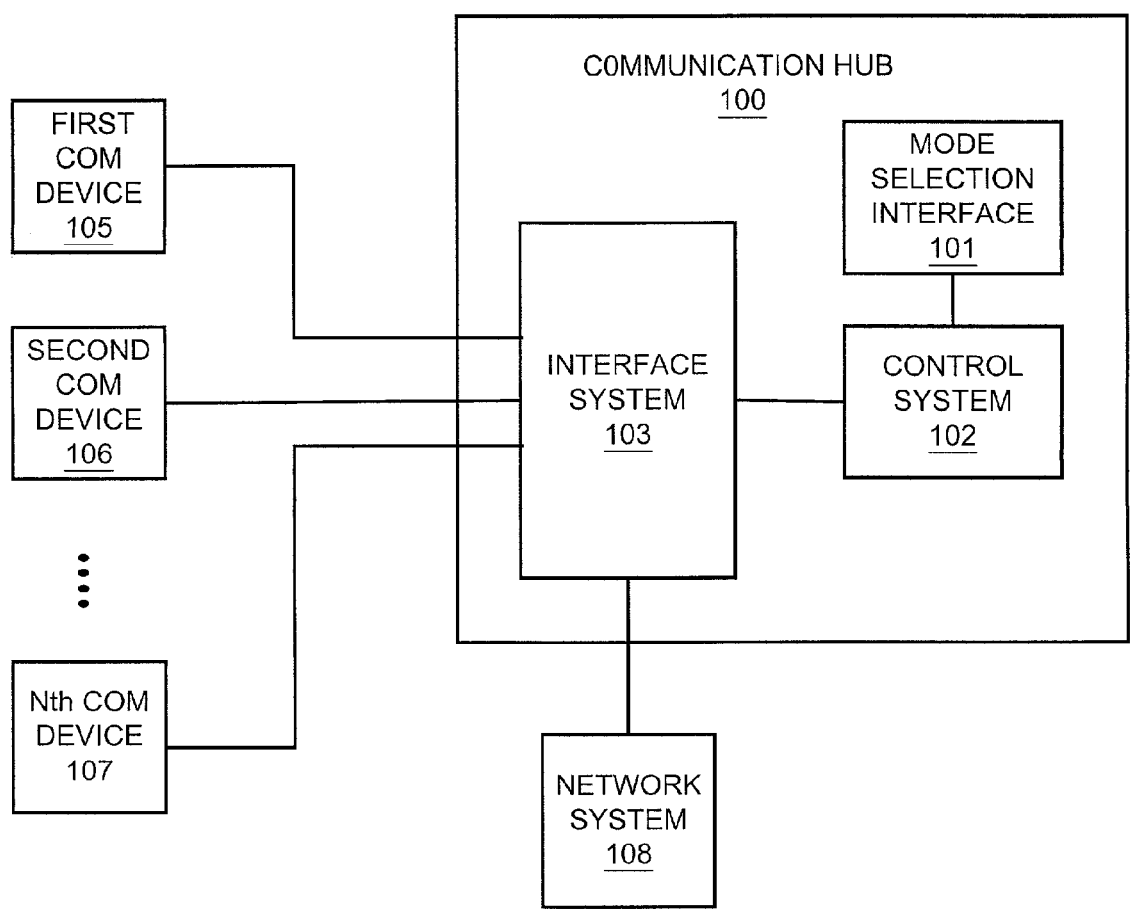
FIG. 1 illustrates an example of a communication hub according to the present invention.

Communication Hub—FIG. 1:

FIG. 1 depicts a communication hub 100, a first communication device 105, a second communication device 106, an Nth communication device 107, and a network system 108. The communication hub 100 comprises an interface system 103, a mode selection interface 101 and a control system 102. The interface system 103 is linked to the communication devices 105-107, the control system 102, and the network system 108. The control system 102 is connected to the mode selection interface 101. Those skilled in the art will appreciate that the links between the interface system 103 and the communication devices 105-107 could be conventional wireless or wireline connections as a matter of design choice. Those skilled in the art will also appreciate that the communication hub 100 would include other conventional components not shown on FIG. 1 for clarity. In addition, the communication hub 100 could accommodate additional communication devices as a matter of design choice, although only communication devices 105-107 are shown for clarity.

The interface system 103 could be any device or group of devices configured to receive a registration request from a communication device, e.g. device 106, and provide the registration request to the control system 102. The interface system 103 is also configured to exchange communication services between the communication devices 105-107 and the network system 108. For example, the interface system 103 could receive requests for communication service from the communication devices 105-107 and provide the requests to the control system 102. The interface system 103 could also receive control information from the control system 102. The interface system 103 could be a conventional wireless or wireline voice interface that acts as a POTS interface, supervises signals, channels voice lines, or resolves contention between voice lines. The interface system 103 could also be a wireless or wireline data interface that manages data streams, performs multiplexing, and/or concentrates data lines. In some examples of the present invention, the interface system 103 could include a wireless interface for wireless communication devices and could include a wireline interface for wireline devices.

The communication services could be any communication services provided to a service subscriber. Some examples of the communication services include without limitation, voice, data and video communications including, FAX communications, audio broadcasts, pay-per-view video broadcasts, web browsing, data file exchange and e-mail. The communication devices 105, 106 and 107 could be any communication devices that transfer and/or receive information such as voice, data, or video. The communication devices 105, 106, and 107 could be wireline communication devices, wireless communication devices, or a combination of wireless and wireline communication devices. Some examples of the communication devices 105-107 include without limitation, telephones, fax machines, modems, answering machines, computers, stereos, and televisions. The communication devices 105-107 are unauthorized when the communication devices 105-107 are not currently configured, authorized, or unknown to or with the communication hub 100.

The control system 102 could be any processing platform configured to switch between a configuration mode and an operation mode. In response to switching to the configuration mode, the control system 102 receives a registration request from an unauthorized communication device, e.g. device 105, and processes the registration request to automatically authorize the communication device 105 for use with the communication hub 100. In response to switching to the operation mode, the control system 102 controls the exchange of communication services between the communications devices 105-107 and the network system 108. Those skilled in the art will appreciate that in some examples of the present invention, the control system 102 could be distributed within the interface system 103 and/or the mode selection interface 101. In some examples, this form of registration is used by hotels or other public facilities to allow customers to register their device temporarily and/or allow vendors to rent a device and register the device to a user with a specified operational configuration.

The registration request could be any signal generated by a communication device during startup or initial use. For example the registration request for a wireless communication device could be a conventional signal generated when the device is powered on and attempts to register with a cell site. The registration request for a wireline communication device could be a conventional off-hook signal.

The mode selection interface 101 could be any device or group of devices configured to receive a user input that indicates one of the operation mode or the configuration mode. Responsive to receiving the input, the mode selection interface 101 causes the control system 102 to switch to the selected one of the operation mode or the configuration mode. In one example of the present communication hub 100, the mode selection interface 101 could be a simple switch device used to select one of the operation mode or the configuration mode. In another example of the present communication hub 100, the mode selection interface 101 could also include a display, such as a liquid crystal display, that provides feedback to the user regarding the selected one of the configuration or operation mode. In yet another example, the display could also be used to convey other information to the user. For example, the control system 102 could display a message for the user that indicates the completion of the authorization process. The display could also be used for messages that indicate various error conditions in the authorization process. In some embodiments, the display is a light emitting diode (LED) or a plurality of LEDs to indicate modes and conditions.

The network system 108 could be one or more communication networks configured to provide communication services. For example, the network system 108 could comprise a Local Area Network ("LAN") or a Wide Area Network "(WAN") or a LAN connected to a WAN. The network system 108 could also be interconnected with other WANs by a data network, such as an Internet Protocol ("IP"), Frame Relay, or asynchronous transfer mode ("ATM") network. In another example of the present invention, the network system 108 could be connected to other wireline or wireless networks. For example, the network system 108 could be connected to the public switched telephone network, an ATM network, IP network or a personal communication service ("PCS") network. The network system 108 could also bill, authorize, or exchange communication services with the communication hub 100.

Figure 2:
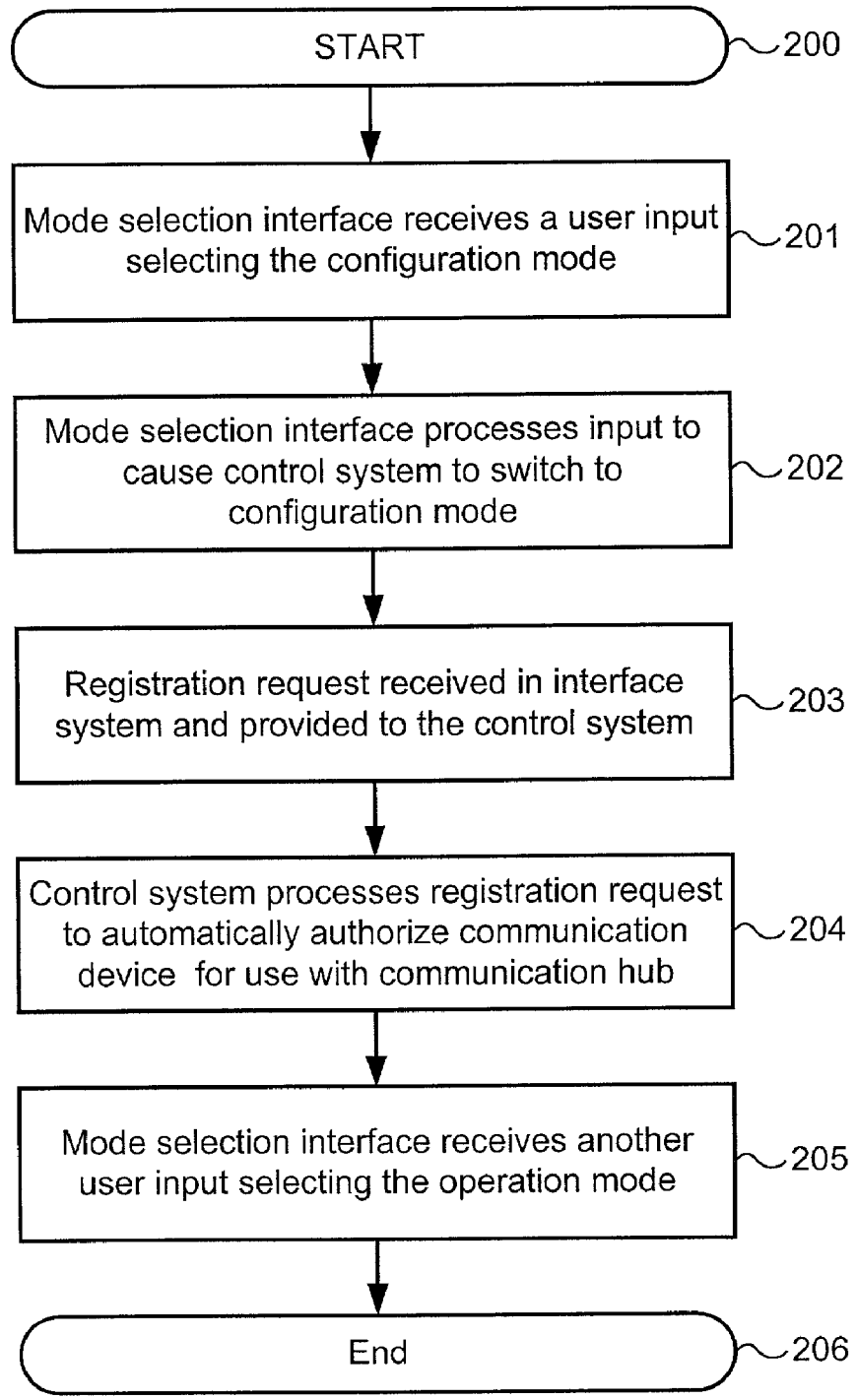
FIG. 2 is a flow chart illustrating an example of the operation of a communication hub according to the present invention.

Operation FIGS. 2-5:

FIG. 2 is a flow chart illustrating the operation of the communication hub 100 according to the present invention. In this example, the communication hub 100 could be a wireless base station and the communication device 105 a previously unauthorized wireless communication device. The communication hub 100 is initially in the operation mode. On FIG. 2, the operation begins at step 200. At step 201, the mode selection interface 101 receives a user input that selects the configuration mode. At step 202, the mode selection interface 101 processes the input to cause the control system 102 to switch to the configuration mode. Upon being switched on, the communication device 105 attempts to register with a cell site by generating and transmitting a registration request. At step 203, the registration request is received in the interface system 103 and is provided to the control system 102. At step 204, the control system 102 process the registration request to automatically authorize the communication device 105 for use with the communication hub 100. One example of the authorization process could be recording an identifier provided in the registration request as an allowed identifier in the logs of the communication hub 100. At step 205, the mode selection interface 101 receives another user input that selects the operation mode and the configuration process is complete. At step 206 the operation ends.

Figure 3:
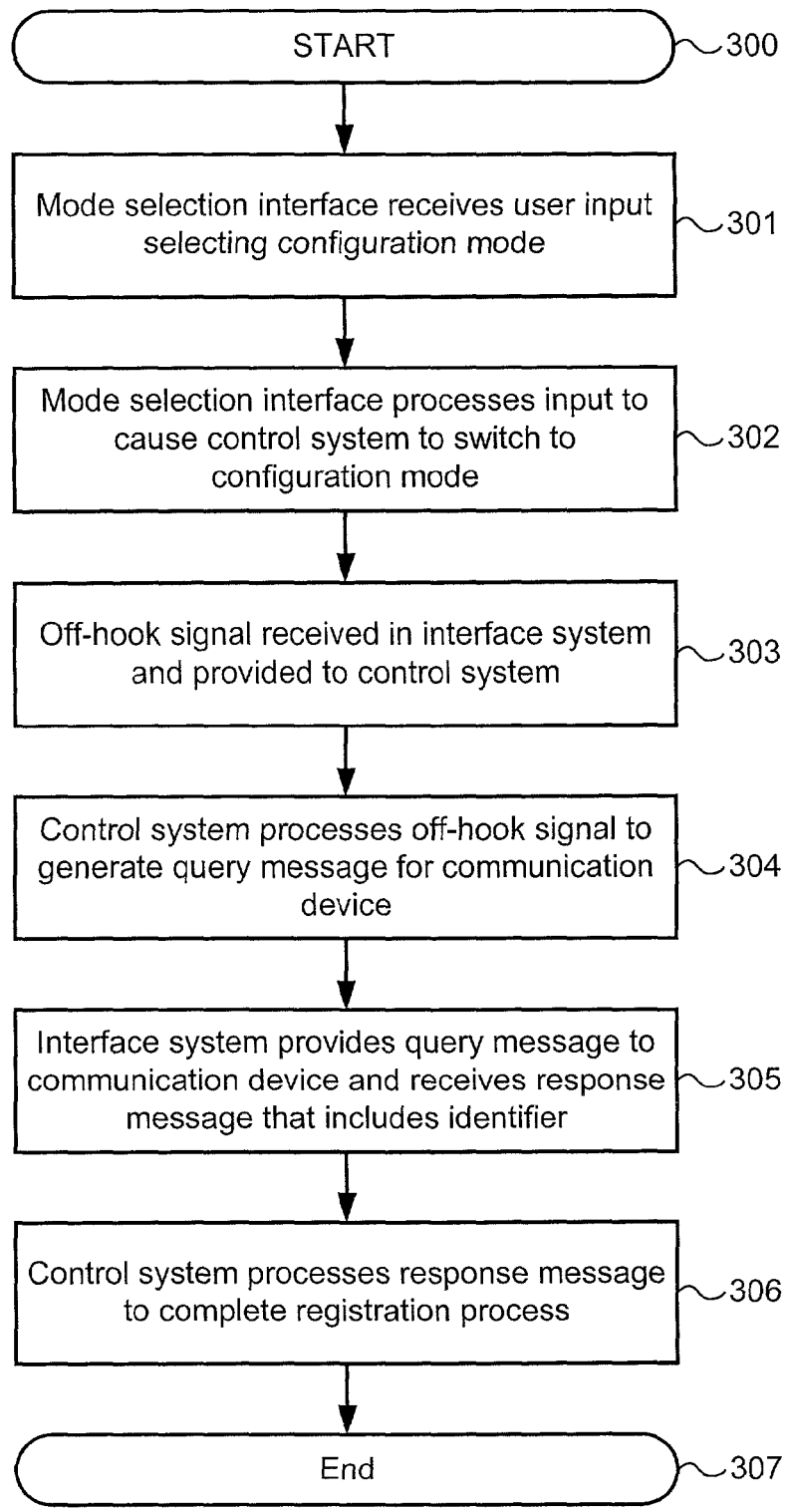
FIG. 3 is a flow chart illustrating another example of the operation of a communication hub according to the present invention.

FIG. 3 is a flow chart illustrating another example of the operation of the communication hub 100 according to the present invention. In this example, the communication device 105 is a conventional wireline telephone, and the communication hub 100 is a PBX. On FIG. 3 the operation begins at step 300. At step 301, the mode selection interface 101 receives a user input that selects the configuration mode. At step 302, the mode selection interface 101 processes the input to cause the control system 102 to switch to the configuration mode. At step 303, the communication device 105 generates an off-hook signal in response to a user removing the receiver. At step 303, the off-hook signal is received in the interface system 103 and is provided to the control system 102. The control system 102 treats the off-hook signal as a request for authorization of the communication device 105.

At step 304, the control system 102 processes the off-hook signal to generate a query message for the communication device 105. The query message includes a request for an identifier for the communication device 105. The identifier could be a numeric or alphanumeric identifier, pointer, or an index that indicates the communication device 105. At step 305, the interface system 103 provides the query message to the communication device 105 and receives a response message from the communication device 105 that includes the identifier. At step 306, the control system 102 processes the response message to record the identifier as an allowed identifier in the logs of the communication hub 100 to complete the registration process. The operation ends at step 307.

Figure 4:
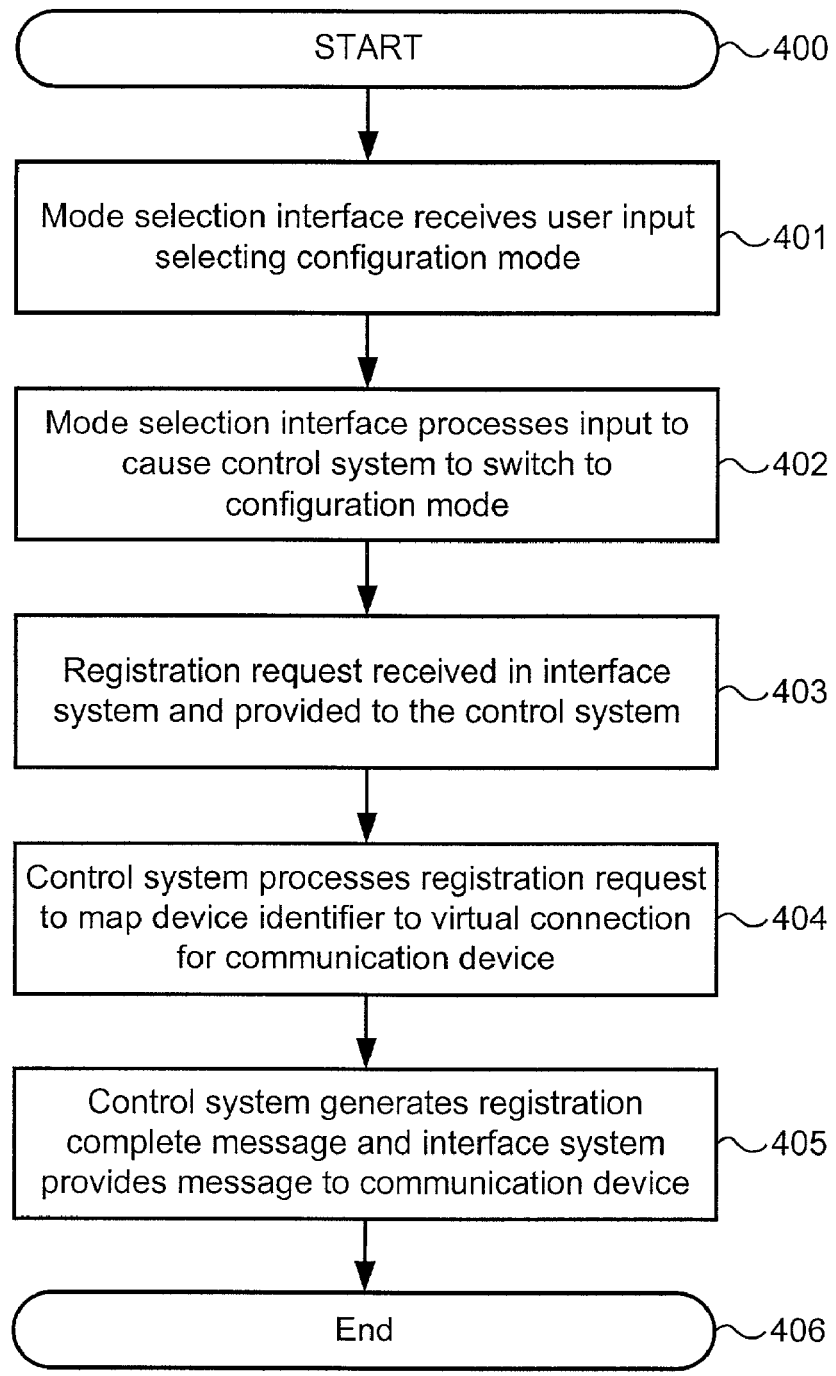
FIG. 4 is a flow chart illustrating another example of the operation of a communication hub according to the present invention.

FIG. 4 is a flow chart illustrating another example of the operation of the communication hub 100 according to the present invention. In this example, the communication device 105 is a wireless communication device, and the communication hub 100 is a wireless base station. On FIG. 4, the operation begins at step 400. At step 401, the mode selection interface 101 receives a user input that selects the configuration mode. At step 402, the mode selection interface 101 processes the input to cause the control system 102 to switch to the configuration mode. Upon being switched on, the communication device 105 attempts to register with a cell site by generating and transmitting a registration request including a device identifier. At step 403, the registration request is received in the interface system 103 and provided to the control system 102. The control system 102 treats the registration request as a request for authorization of the communication device 105. At step 404, the control system 102 processes the registration request to map a device identifier received in the registration request to a virtual connection for use by the communication device 105. Mapping the device identifier could be any process representative of using the device identifier to identify the virtual connection for communications from the communication device 105. For example, the control system 102 could use the device identifier to uniquely identify service requests from the communication device 105 in the logs of the communication hub 100. Responsive to completing the configuration of the communication device 105, the control system 102 generates a registration complete message for the communication device 105, at step 405. Also at step 405, the registration complete message is provided to the communication device 105 by the interface system 103. The registration complete message causes the communication device 105 to indicate to the user that the communication device 105 and communication hub 100 are configured for operation. For example, the communication device 105 could display a text message on the display of the communication device 105. In another example, the registration complete message could cause the communication device 105 to produce an audible tone indicating that the configuration process is complete. Those skilled in the art will appreciate numerous other methods that could be used to indicate the completion of the configuration process to the user by using signaling between the communication hub 100 and the communication device 105.

Figure 5:
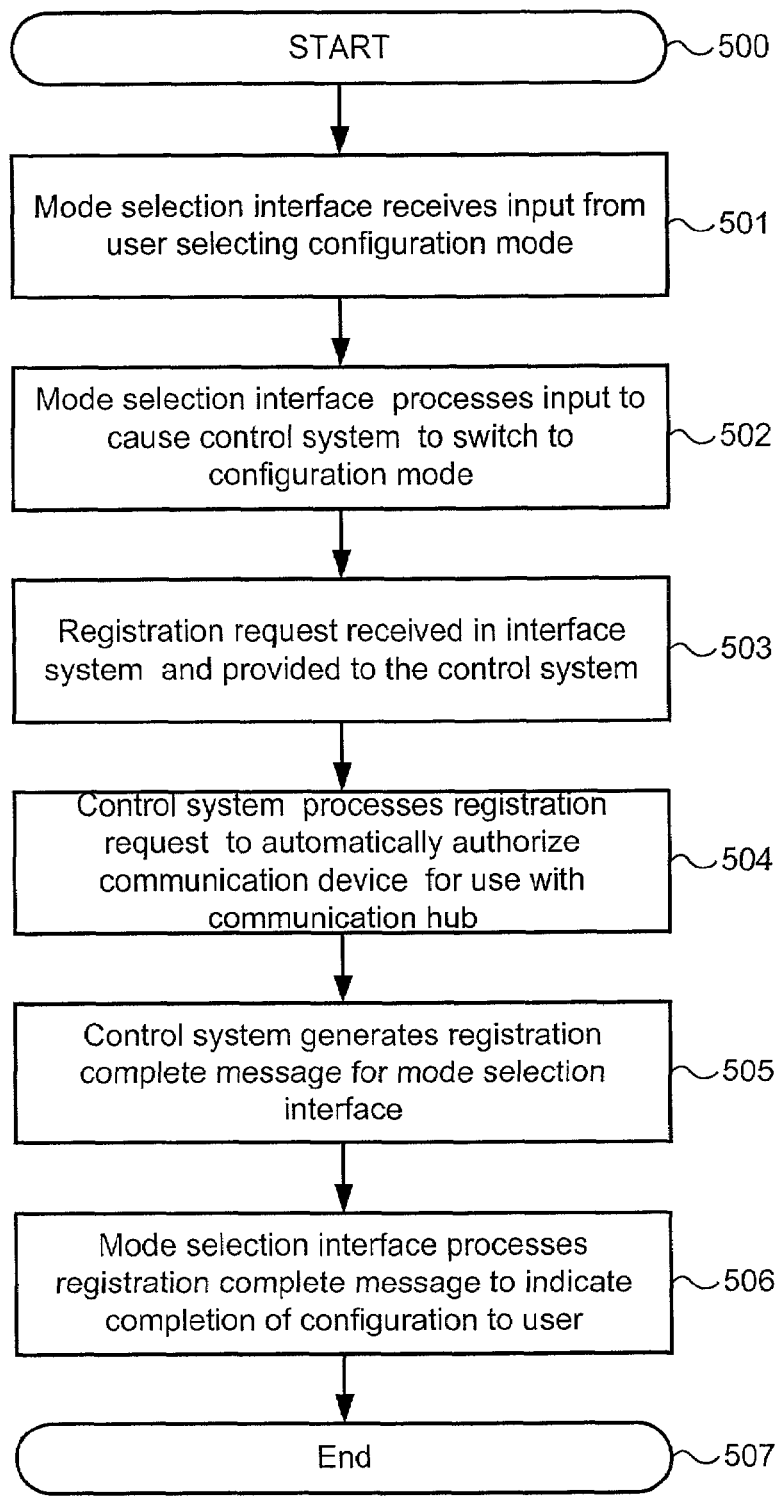
FIG. 5 is a flow chart illustrating another example of the operation of a communication hub according to the present invention.

FIG. 5 is a flow chart illustrating another example of the operation of the communication hub 100 according to the present invention. On FIG. 5, the operation begins at step 500. At step 501, the mode selection interface 101 receives a user input that selects the configuration mode. At step 502, the mode selection interface 101 processes the input to cause the control system 102 to switch to the configuration mode. Upon being switched on, the communication device 105 attempts to register with a cell site by generating and transmitting a registration request. At step 503, the registration request is received in the interface system 103 and provided to the control system 102. The control system 102 treats the registration request as a request for authorization of the communication device. At step 504, the control system 102 processes the registration request to authorize the communication device 105 for use with the communication hub 100. Responsive to completing the configuration, the control system 102 generates a registration complete message for the mode selection interface 101, at step 505. At step 506, the mode selection interface 101 processes the registration complete message to indicate to the user that configuration of the communication device 105 is complete. Similar to the above example, the mode selection interface 101 could display a text message on a display. In another example, the mode selection interface could automatically switch back to the operation mode upon completion of the configuration process.

The above-described systems could be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art will appreciate variations of the above described embodiments that fall within the scope of the invention. As a result, the invention is not limited to the specific examples and illustrations discussed above, but only by the following claims and their equivalents.

I claim:

1. A communication hub comprising:
a control system configured to switch between either a configuration mode or an operation mode, wherein responsive to switching to the configuration mode the control system is configured to receive a registration request comprising an off-hook signal from an unauthorized communication device, process the registration request to generate a query message for the unauthorized communication device that includes a request for a device identifier, and process a response message from the unauthorized communication device that includes the device identifier to automatically authorize the unauthorized communication device for use with the communication hub as a newly authorized communication device and to assign a virtual connection between the newly authorized communication device and a network system, and wherein responsive to switching to the operation mode the control system is configured to control an exchange of communications between a plurality of previously authorized communication devices, the newly authorized communication device, and the network system;
a mode selection interface configured to receive an input from a user that selects either one of the configuration mode or the operation mode, and process the input to cause the control system to enter the selected one of the configuration mode or the operation mode; and
an interface system configured to receive the registration request and exchange the communications between the plurality of previously registered communication devices, the newly registered communication device, and the network system.

2. The communication hub of claim 1 wherein the control system is configured to generate a registration complete message for the newly authorized communication device, wherein the registration complete message causes the newly authorized communication device to indicate to the user that the newly authorized communication device is configured for use with the communication hub.

3. The communication hub of claim 2 wherein the interface system is configured to provide the registration complete message to the newly authorized communication device.

4. The communication hub of claim 1 wherein the control system is configured to cause the mode selection interface to indicate to the user that the newly authorized communication device is configured for use with the communication hub.

5. The communication hub of claim 1 wherein automatically authorizing the unauthorized communication device for use with the communication hub comprises:
recording the newly authorized communication device in the in the communication hub as an allowed communication device.

6. The communication hub of claim 1 wherein the interface system is configured to provide the query message to the unauthorized communication device and provide the response message to the control system.

7. The communication hub of claim 1 wherein the control system is configured to use the device identifier to identify communication requests made by the newly authorized communication device.

8. The communication hub of claim 1 wherein the newly authorized communication device is a wireless communication device.

9. The communication hub of claim 1 wherein the newly authorized communication device is a wireline communication device.

10. A method of operating a communication hub, the method comprising:
receiving an input from a user that indicates a desired one of either a configuration mode or an operation mode;
processing the input to switch to the desired one of the configuration mode or the operation mode;
in response to switching to the configuration mode, receiving a registration request comprising an off-hook signal from an unauthorized communication device;
in response to receiving the registration request, processing the registration request to generate a query message that includes a request for a device identifier for the unauthorized communication device;
processing a response message from the unauthorized communication device that includes the device identifier to automatically authorize the unauthorized communication device for use with the communication hub as a newly authorized communication device and to assign a virtual connection between the newly authorized communication device and a network system; and
in response to switching to the operation mode, exchanging communications between a plurality of authorized communication devices, the newly authorized communication device, and the network system.

11. The method of claim 10 the method further comprising:
indicating to the user that the newly authorized communication device is configured for use with the communication hub.

12. The method of claim 11 wherein the step of indicating to the user comprises:
in response to automatically authorizing the unauthorized communication device, generating a registration complete message that causes the newly authorized communication device to indicate to the user that the newly authorized communication device is configured for use with the communication hub; and
providing the registration complete message to the communication device.

13. The method of claim 11 wherein the step of indicating to the user comprises:
in the communication hub, displaying a message for the user that indicates to the user that the newly authorized communication device is authorized for use with the communication hub.

14. The method of claim 10 wherein automatically registering the unauthorized communication device comprises:

recording the newly authorized communication device in the communication hub as an authorized communication device.

15. The method of claim 10 the method further comprising:
using the device identifier to identify communication service requests from the newly authorized communication device.

16. The method of claim 10 wherein the newly authorized communication device is a wireless communication device.

17. The method of claim 10 wherein the newly authorized communication device is a wireline communication device.

18. A software product that includes a medium readable by a processor, the medium having stored thereon:
control system software operational when executed by the processor to switch between either a configuration mode or an operation mode, wherein responsive to switching to the configuration mode the control system is configured to receive a registration request comprising an off-hook signal from an unauthorized communication device, process the registration request to generate a query message for the unauthorized communication device that includes a request for a device identifier, and process a response message from the unauthorized communication device that includes the device identifier to automatically authorize the communication device for use with the communication hub as a newly authorized communication device and to assign a virtual connection between the newly authorized communication device and a network system, and wherein responsive to switching to the operation mode the control system is configured to control an exchange of communications between a plurality of previously authorized communication devices, the newly authorized communication device, and the network system;
mode selection interface software operational when executed by the processor to receive an input from a user that selects one of either the configuration mode or the operation mode, and process the input to cause the control system to enter the selected one of the configuration mode or the operation mode; and
interface system software operational when executed by the processor to receive the registration request, provide the query message to the unauthorized communication device, provide the response message to the control system and exchange the communications between the plurality of previously registered communication devices, the newly registered communication device, and the network system.

19. The software product of claim 18 wherein the control system software is operational when executed by the processor to generate a registration complete message for the newly authorized communication device, wherein the registration complete message causes the newly authorized communication device to indicate to the user that the newly authorized communication device is configured for use with the communication hub.

20. The software product of claim 19 wherein the interface system software is operational when executed by the processor to provide the registration complete message to the newly authorized communication device.

21. The software product of claim 18 wherein the control system software is operational when executed by the processor to cause the mode selection interface to indicate to the user that the newly authorized communication device is configured for use with the communication hub.

22. The software product of claim 18 wherein the control system software is operational when executed by the processor to record the newly authorized communication device in the communication hub as an allowed communication device.

23. The software product of claim 18 wherein the control system software is operational when executed by the processor to use the device identifier to identify communication requests made by the newly authorized communication device.

24. The software product of claim 18 wherein the newly authorized communication device is a wireless communication device.

25. The software product of claim 18 wherein the newly authorized communication device is a wireline communication device.

* * * * *